United States Patent
Wagner et al.

(10) Patent No.: US 10,006,375 B1
(45) Date of Patent: Jun. 26, 2018

(54) PROPULSION SYSTEM FOR AN AIRCRAFT

(71) Applicant: General Electric Company, Schenectady, NY (US)

(72) Inventors: Nicholas Adam Wagner, Revere, MA (US); Daniel E. Bergsten, Topsfield, MA (US); David Allen Gutz, Wenham, MA (US)

(73) Assignee: General Electric Company, Schenectady, NY (US)

( * ) Notice: Subject to any disclaimer, the term of this patent is extended or adjusted under 35 U.S.C. 154(b) by 0 days. days.

(21) Appl. No.: 15/646,592

(22) Filed: Jul. 11, 2017

(51) Int. Cl.
| | | |
|---|---|---|
| *B64C 13/00* | (2006.01) |
| *F02C 9/46* | (2006.01) |
| *B64C 27/14* | (2006.01) |
| *B64D 27/24* | (2006.01) |
| *B64D 27/10* | (2006.01) |
| *F02C 9/28* | (2006.01) |
| *F02C 6/20* | (2006.01) |
| *H02P 3/14* | (2006.01) |
| *H02P 3/12* | (2006.01) |
| *B64D 27/02* | (2006.01) |

(52) U.S. Cl.
CPC ............... *F02C 9/46* (2013.01); *B64C 27/14* (2013.01); *B64D 27/10* (2013.01); *B64D 27/24* (2013.01); *F02C 6/206* (2013.01); *F02C 9/28* (2013.01); *H02P 3/12* (2013.01); *H02P 3/14* (2013.01); *B64D 2027/026* (2013.01); *F05D 2220/329* (2013.01)

(58) Field of Classification Search
CPC ...... H02P 1/00; H02P 3/00; H02P 6/00; H02P 27/04; F02C 9/00; F02C 9/28; B64D 31/00; B64C 27/04

USPC ..... 244/2, 17.25, 50, 75.1, 221, 158.1, 12.3; 318/400.01, 700, 701, 727, 799, 801, 805
See application file for complete search history.

(56) References Cited

U.S. PATENT DOCUMENTS

| | | | |
|---|---|---|---|
| 5,951,608 A | 9/1999 | Osder | |
| 6,012,676 A | 1/2000 | Gold et al. | |
| 8,271,151 B2 | 9/2012 | Hasan et al. | |
| 8,549,833 B2* | 10/2013 | Hyde | F02C 6/00 60/204 |
| 8,684,314 B2 | 4/2014 | Chaduc et al. | |
| 8,825,342 B2* | 9/2014 | Schaeffer | F01D 17/06 415/13 |
| 9,193,479 B2 | 11/2015 | Moy et al. | |

(Continued)

OTHER PUBLICATIONS

U.S. Appl. No. 15/618,257, filed Jun. 9, 2017.

*Primary Examiner* — Antony M Paul
(74) *Attorney, Agent, or Firm* — General Electric Company; William Andes

(57) ABSTRACT

A hybrid electric propulsion system includes a turbomachine, an electric machine coupled to the turbomachine, and a propulsor coupled to the turbomachine. A method for operating the hybrid electric propulsion system includes operating the turbomachine to drive the propulsor; receiving data indicative of a failure condition of the hybrid electric propulsion system; reducing a fuel flow to a combustion section of the turbomachine in response to receiving the data indicative of the failure condition; and extracting power from the turbomachine using the electric machine to slow down one or more rotating components of the turbomachine in response to receiving the data indicative of the failure condition.

20 Claims, 6 Drawing Sheets

(56) References Cited

U.S. PATENT DOCUMENTS

| | | |
|---|---|---|
| 9,221,535 B2 | 12/2015 | Gordon et al. |
| 9,248,908 B1 | 2/2016 | Luyks |
| 9,446,842 B2 | 9/2016 | Luyks |
| 2013/0327014 A1* | 12/2013 | Moulebhar ............. F02K 3/065 |
| | | 60/226.2 |
| 2016/0177819 A1 | 6/2016 | Schwarz et al. |
| 2016/0325830 A1 | 11/2016 | Waltner et al. |
| 2017/0022899 A1 | 1/2017 | Schwarz et al. |
| 2017/0226934 A1* | 8/2017 | Robic ....................... F02C 7/32 |

* cited by examiner

PROPULSION SYSTEM FOR AN AIRCRAFT

FIELD

The present subject matter relates generally to a hybrid electric propulsion system for the aircraft, and a method for operating the hybrid electric propulsion system to reduce a risk of damage during a failure condition.

BACKGROUND

A conventional helicopter generally includes a main rotor assembly and a tail rotor assembly. A turbomachine is included with an output shaft configured to drive the main rotor assembly and tail rotor assembly. Typical turbomachines include a high pressure system, or core, in addition to a low pressure system. A low pressure shaft of the low pressure system is mechanically coupled to the output shaft through a gearbox for driving the output shaft, and in turn, the main rotor assembly and tail rotor assembly.

A rotational speed of the low pressure system relative to the core may be reduced due to a drag on the low pressure system from the main rotor assembly and tail rotor assembly. However, in the event of a loss of load failure, such as an output shaft failure or rotor loss, the drag on the low pressure system may be greatly reduced. A relatively high amount of energy (i.e., carryover energy) within the core may drive the low pressure system to rotate at relatively dangerous rotational speeds subsequent to the loss of such drag, despite a reduction in a fuel flow to the core. In order to ensure the low pressure system does not fail in such a failure condition, the low pressure system is designed to accept the carryover energy from the core in a loss of load condition, and more particularly, a turbine of the low pressure system is designed to be able to rotate at higher rotational speeds than would otherwise be necessary. However, such may lead to a relatively heavy, large, and expensive low pressure system, or more particularly, a relatively large bore within the turbine of the low pressure system.

Accordingly, a propulsion system capable of reducing a size of one or more components of the low pressure system without compromising the low pressure system's ability to function subsequent to a loss of load condition would be useful.

BRIEF DESCRIPTION

Aspects and advantages of the invention will be set forth in part in the following description, or may be obvious from the description, or may be learned through practice of the invention.

In one exemplary aspect of the present disclosure, a method for operating a hybrid electric propulsion system of an aircraft is provided. The hybrid electric propulsion system includes a turbomachine, an electric machine coupled to the turbomachine, and a propulsor coupled to the turbomachine. The method includes operating the turbomachine to drive the propulsor; receiving data indicative of a failure condition of the hybrid electric propulsion system; reducing a fuel flow to a combustion section of the turbomachine in response to receiving the data indicative of the failure condition; and extracting power from the turbomachine using the electric machine to slow down one or more rotating components of the turbomachine in response to receiving the data indicative of the failure condition.

In certain exemplary aspects extracting power from the turbomachine using the electric machine includes extracting power from the turbomachine using the electric machine substantially simultaneously with reducing the fuel flow to the combustion section of the turbomachine.

In certain exemplary aspects the turbomachine includes a high pressure turbine and a low pressure turbine, wherein the electric machine is coupled to the high pressure turbine and wherein the propulsor is coupled to the low pressure turbine. For example, in certain exemplary aspects the data indicative of the failure condition is data indicative of a rotational speed of the low pressure turbine exceeding an upper rotational speed threshold. For example, in certain exemplary aspects extracting power from the turbomachine using the electric machine to slow down one or more rotating components of the turbomachine includes reducing a rotational speed of the high pressure turbine.

In certain exemplary aspects the failure condition is a loss of load condition.

In certain exemplary aspects the turbomachine is a turboshaft engine including a low pressure turbine and an output shaft coupled to the low pressure turbine. For example, in certain exemplary aspects the aircraft is a helicopter, wherein the propulsor is a rotor assembly, and wherein the output shaft drives the rotor assembly.

In certain exemplary aspects extracting power from the turbomachine using the electric machine includes extracting at least about twenty kilowatts of electrical power with the electric machine.

In certain exemplary aspects the hybrid electric propulsion system further includes an electric energy storage unit, and wherein extracting power from the turbomachine using the electric machine includes providing electrical power from the electric machine to the electric energy storage unit. For example, in certain exemplary aspects the electric energy storage unit is configured to store at least about twenty kilowatt-hours of electrical power.

In certain exemplary aspects extracting power from the turbomachine using the electric machine includes providing electrical power from the electric machine to an electrical resistance bank.

In certain exemplary aspects reducing the fuel flow to the combustion section of the turbomachine includes terminating the fuel flow to the combustion section of the turbomachine.

In an exemplary embodiment of the present disclosure, a hybrid electric propulsion system for an aircraft is provided. The hybrid electric propulsion system includes a turbomachine including a combustion section; a propulsor coupled to the turbomachine; an electric machine also coupled to the turbomachine; and a controller. The controller is configured to receive data indicative of a failure condition of the hybrid electric propulsion system during operation of the turbomachine and, in response, reduce a fuel flow to the combustion section of the turbomachine and extract power from the turbomachine using the electric machine.

In certain exemplary embodiments the controller is configured to extract power from the turbomachine using the electric machine substantially simultaneously with reducing the fuel flow to the combustion section of the turbomachine.

In certain exemplary embodiments the turbomachine includes a high pressure turbine and a low pressure turbine, wherein the electric machine is coupled to the high pressure turbine and wherein the propulsor is coupled to the low pressure turbine. For example, in certain exemplary embodiments in extracting power from the turbomachine using the electric machine to slow down one or more rotating components of the turbomachine, the controller is configured to reduce a rotational speed of the high pressure turbine.

In certain exemplary embodiments the turbomachine is a turboshaft engine including a low pressure turbine and an output shaft coupled to the low pressure turbine.

In certain exemplary embodiments in extracting power from the turbomachine using the electric machine, the controller is configured to extract at least about twenty kilowatts of electrical power with the electric machine.

In certain exemplary embodiments the hybrid electric propulsion system further includes an electric energy storage unit, and wherein in extracting power from the turbomachine using the electric machine, the controller is configured to provide electrical power from the electric machine to the electric energy storage unit.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
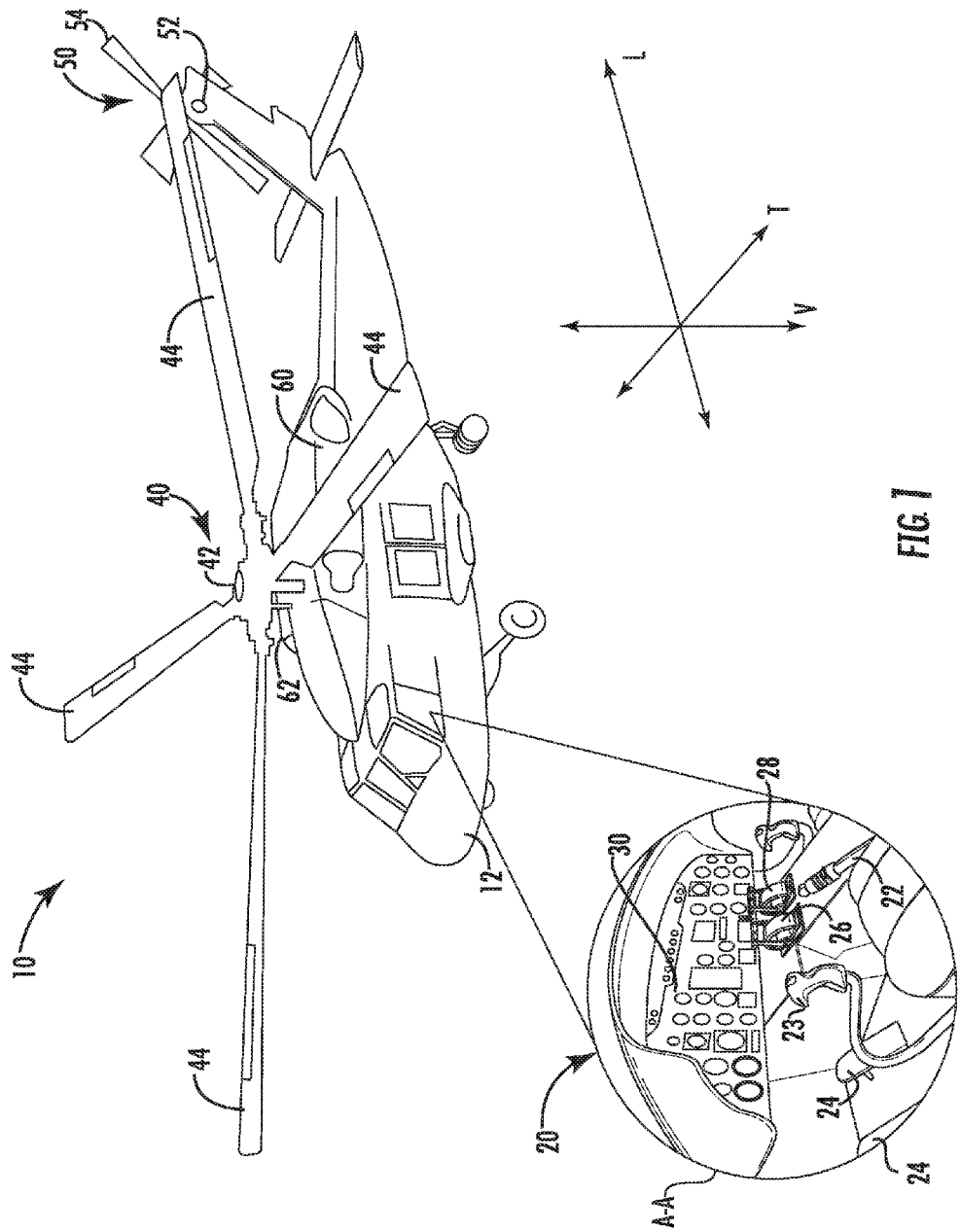
FIG. 1 is a perspective view of an aircraft according to various exemplary embodiments of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components.

The terms "forward" and "aft" refer to relative positions within a turbomachine or vehicle, and refer to the normal operational attitude of the turbomachine or vehicle. For example, with regard to a turbomachine, forward refers to a position closer to an engine inlet and aft refers to a position closer to an engine nozzle or exhaust.

The terms "upstream" and "downstream" refer to the relative direction with respect to a flow in a pathway. For example, with respect to a fluid flow, "upstream" refers to the direction from which the fluid flows, and "downstream" refers to the direction to which the fluid flows. However, the terms "upstream" and "downstream" as used herein may also refer to a flow of electricity.

The singular forms "a", "an", and "the" include plural references unless the context clearly dictates otherwise.

The terms "coupled," "fixed," "attached to," and the like refer to both direct coupling, fixing, or attaching, as well as indirect coupling, fixing, or attaching through one or more intermediate components or features, unless otherwise specified herein.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a twenty percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

The present disclosure is generally related to a hybrid electric propulsion system and a method for operating the same in order to prevent or minimize a risk of over-speeding a low pressure turbine of a turbomachine in the event of a failure condition of the hybrid electric propulsion system. The hybrid electric propulsion system generally includes the turbomachine, an electric machine coupled to the turbomachine, and a propulsor also coupled to the turbomachine. For example, in certain exemplary aspects, the hybrid electric propulsion system may be incorporated into, e.g., a helicopter, such that the turbomachine is a turboshaft engine and the propulsor is a rotor assembly. The electric machine may be coupled to a high pressure system of the turboshaft engine. In the event of a failure condition, such as a loss of load condition, the electric machine may be utilized to extract power from the high pressure system, acting as a drag on the high pressure system, to reduce an amount of energy within the high pressure system of the turboshaft engine. In such a manner, the system may reduce the likelihood that any carryover energy within the high pressure system (i.e., energy remaining, or subsequently generated, within the high pressure system after reducing a fuel flow to a combustor of the turboshaft engine) causes a low pressure system of the turboshaft engine to over-speed during, or subsequent to, the failure condition, potentially damaging one or more components of the turboshaft engine.

In other example aspects, however, the aircraft may be a traditional fixed wing aircraft and the turbomachine and propulsor may be configured together as, e.g., a turbofan engine, turboprop engine, etc. For example, in other exemplary aspects, the electric machine may be coupled to a high pressure system of a turbofan engine for extracting power from the high pressure system of the turbofan engine in response to determining a failure condition, such as a loss of load condition, of the hybrid electric propulsion system. It should be appreciated, however, that in other exemplary aspects of this configuration, or the above-described configuration, the electric machine may instead be coupled to a low pressure system, such that the electric machine may extract power directly from the low pressure system to reduce a rotational speed of the low pressure system, or more particularly, to reduce a likelihood of the low pressure system over-speeding.

Referring now to the drawings, FIG. 1 provides a perspective view of an exemplary aircraft 10 in accordance with the present disclosure. The aircraft 10 generally defines a transverse direction T, a longitudinal direction L, and a vertical direction V. In operation, the aircraft 10 may move along or around the transverse direction T, the longitudinal direction L, and/or the vertical direction V.

In the embodiment illustrated in FIG. 1, the aircraft 10 includes an airframe 12 defining a cockpit 20. As is depicted in the close-up circle A-A, the cockpit 20 includes a collective pitch input device 22, a cyclic pitch input device 23, a tail rotor input device 24, a first throttle input device 26, a second throttle input device 28, and an instrument panel 30. The aircraft 10 further includes a main rotor assembly 40 and a tail rotor assembly 50. The main rotor assembly 40 includes a main rotor hub 42 and a plurality of main rotor blades 44. As shown, each main rotor blade 44 extends outwardly from the main rotor hub 42. The tail rotor section 50 includes a tail rotor hub 52 and a plurality of tail rotor blades 54. Each tail rotor blade 54 extends outwardly from the tail rotor hub 52.

Additionally, the aircraft 10 includes a hybrid electric propulsion assembly (not labeled; see also embodiment of FIG. 2, discussed below), as will be described in greater detail below. The hybrid electric propulsion assembly generally includes a first turbomachine 60 and a second turbomachine 62. It should be appreciated, that in at least certain exemplary embodiments, one or both of the first and second turbomachines 60, 62 of the aircraft 10 in FIG. 1 may be configured in substantially the same manner as the turbomachine 102 depicted in FIG. 2, and further that the hybrid electric propulsion system may further include one or more of the additional components from the exemplary hybrid electric propulsion system depicted in FIG. 2. Additionally, in still other exemplary embodiments, although the aircraft 10 depicted includes two turbomachines, in other embodiments, the aircraft 10 may instead include a single turbomachine, three turbomachines, etc.

Referring still to FIG. 1, the first and second turbomachines 60, 62 may be mechanically coupled to one another such that the first and second turbomachines 60, 62 operate together. For example, the first and second turbomachines 60, 62 may be ganged together in a gearbox by, e.g., differentials and one-way clutches (such as sprag clutches), such that they operate together.

Further, the first and second turbomachines 60, 62 may generally generate and transmit power to drive rotation of the main rotor blades 44 and the tail rotor blades 54. In particular, rotation of the main rotor blades 44 generates lift for the aircraft 10, while rotation of the tail rotor blades 54 generates sideward thrust at the tail rotor section 50 and counteracts torque exerted on the airframe 12 by the main rotor blades 44.

The collective pitch input device 22 adjusts a pitch angle of the main rotor blades 44 collectively (i.e., all at the same time) to increase or decrease an amount of lift the aircraft 10 derives from the main rotor blades 44 at a given rotor speed. Accordingly, manipulating the collective pitch input device 22 may cause the aircraft 10 to move in one of two opposing directions along the vertical direction V. It should be appreciated, that as will be discussed in greater detail, below, manipulating the collective pitch input device 22 may also be used to anticipate a desired power output of the hybrid electric propulsion system to the main rotor assembly 40 to generate, e.g., a desired lift of the aircraft 10.

Referring still to FIG. 1, the cyclic pitch input device 23 controls movement of the aircraft 10 about the longitudinal direction L and about the transverse direction T. In particular, the cyclic pitch input device 23 adjusts an angle of the aircraft 10 allowing the aircraft 10 to move forward or backwards along the longitudinal direction L or sideways in the transverse direction T. Additionally, the tail rotor input device 24 controls a pitch angle of the tail rotor blades 54. In operation, manipulating the tail rotor input device 24 may cause the tail rotor section 50 to move along the transverse direction T and thereby change the orientation of the aircraft 10, and rotating the aircraft 10 about the vertical direction V.

The first and second throttle input devices 24, 26 may be moved to an on position at the start of a flight and actuated during the flight to provide a desired amount of power for the aircraft 10. In certain embodiments, these input devices 24, 26 may be manually actuated, or alternatively may be actuated by one or more controllers (described below), e.g., in response to and input from the collective pitch input device 22.

Figure 2:
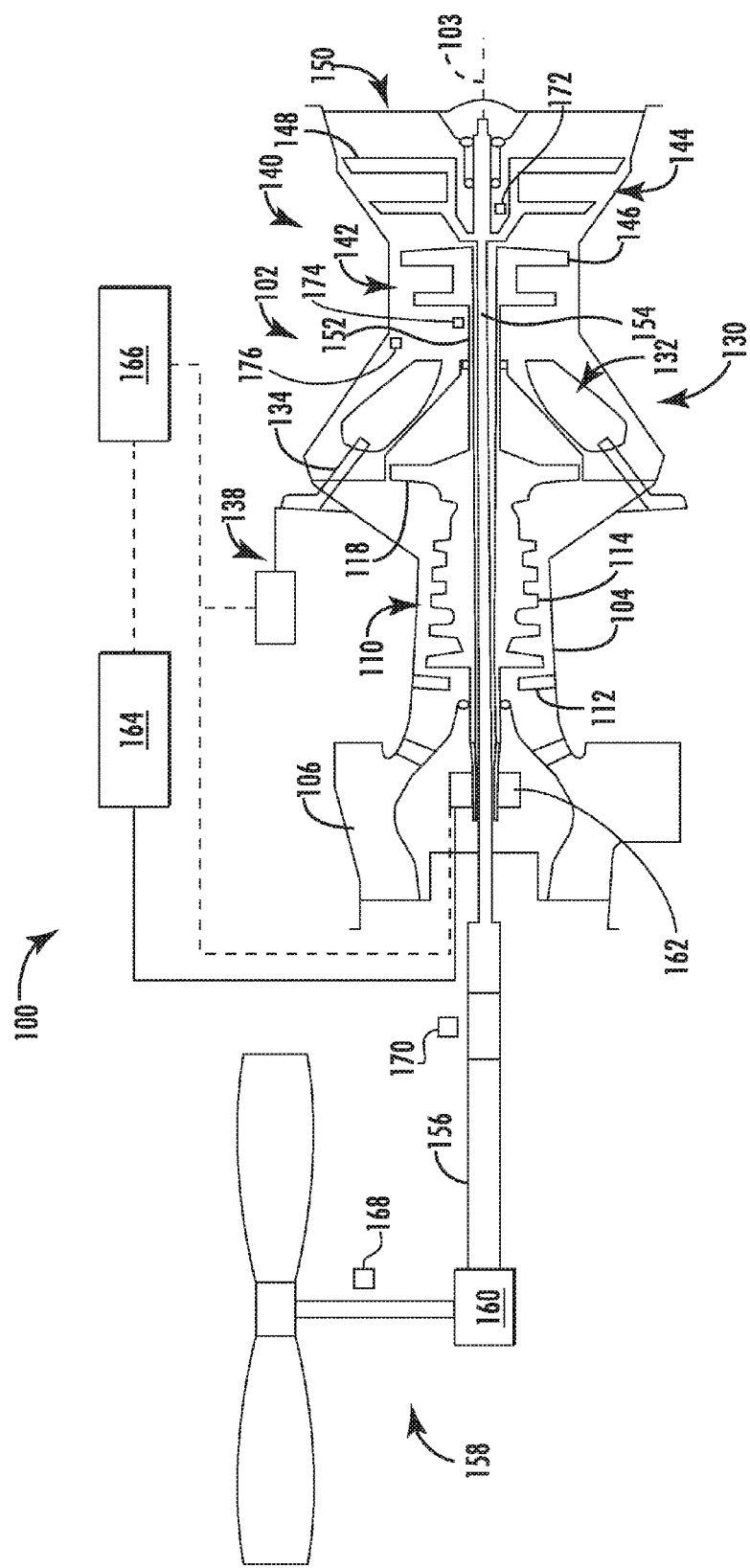
FIG. 2 is a schematic, cross-sectional view of a gas turbine engine incorporated into a hybrid electric propulsion system in accordance with an exemplary embodiment of the present disclosure.

Referring now to FIG. 2 a schematic view is provided of a hybrid electric propulsion system 100 for an aircraft in accordance with an exemplary embodiment of the present disclosure. The exemplary hybrid electric propulsion system 100 may be incorporated into an aircraft similar to the exemplary aircraft 10 described above with reference to FIG. 1. However, in other exemplary embodiments, the hybrid electric propulsion system 100 may instead be utilized with any other suitable aircraft, as described below.

For the embodiment depicted, the hybrid electric propulsion system 100 generally includes a turbomachine 102, a prime propulsor mechanically coupled to the turbomachine 102, an electric machine 162 also mechanically coupled to the turbomachine 102, an electric energy storage unit 164, and a controller 166. Functionality of each of these components is as follows.

With reference first to the turbomachine 102, a cross-sectional view is provided. As is depicted, the turbomachine 102 defines a longitudinal or centerline axis 103 extending there through for reference. The turbomachine 102 generally includes a substantially tubular outer casing 104 that defines an inlet 106. The outer casing 104 encloses, in serial flow relationship, a high pressure compressor 110 (also referred to as a "gas generator compressor"), a combustion section 130, a turbine section 140 including a high pressure turbine 142 (also referred to as a "gas generator turbine") and a low pressure turbine 144 (also referred to as a "power turbine"), and an exhaust section 150. The exemplary high pressure compressor 110 depicted includes an annular array of inlet guide vanes 112, one or more sequential stages of compressor blades 114, and a stage of centrifugal rotor blades 118. Although not depicted, the high pressure compressor 110 may also include a plurality of fixed or variable stator vanes.

The combustion section 130 generally includes a combustion chamber 132, one or more fuel nozzles 134 extending into the combustion chamber 132, and a fuel delivery system 138. The fuel delivery system 138 is configured to provide fuel to the one or more fuel nozzles 134, which, in turn, supply fuel to mix with compressed air from the high pressure compressor 110 entering the combustion chamber 132. Further, the mixture of fuel and compressed air is ignited within the combustion chamber 132 to form combustion gases. As will be described below in more detail, the combustion gases drive both the high pressure compressor 110 and the turbines within the turbine section 140.

More specifically, as stated, the turbine section 140 includes the high pressure turbine 142 the low pressure turbine 144. The high pressure turbine 142 includes one or more sequential stages of turbine rotor blades 146, and may further include one or more sequential stages of stator vanes (not shown). Likewise, the low pressure turbine 144 includes one or more sequential stages of turbine rotor blades 148, and may further include one or more sequential stages of stator vanes (also not shown). Additionally, the high pressure turbine 142 is drivingly connected to the high pressure compressor 110 via a high pressure/gas generator shaft 152, and the power turbine 144 is drivingly connected to an output shaft 156 via a low pressure/power turbine shaft 154.

In operation, the combustion gases drive both the high pressure turbine 142 and the low pressure turbine 144. As the high pressure turbine 142 (including the one or more sequential stages of HP turbine rotor blades 146) rotates around the centerline axis 103, the high pressure compressor 110 and the high pressure shaft 152 both also rotate around the centerline axis 103. Further, as the low pressure turbine 144 (including the one or more sequential stages of LP turbine rotor blades 148) rotates, the low pressure turbine shaft 154 rotates and transfers rotational energy to the output shaft 156. Accordingly, it will be appreciated that the high pressure turbine 142 drives the high pressure compressor 110 and the low pressure turbine 144 drives the output shaft 156.

It should be appreciated, however, that in other exemplary embodiments, the turbomachine 102 of FIG. 2 may instead have any other suitable configuration. For example, in other exemplary embodiments, the combustion section 130 may include a reverse flow combustor, the turbomachine 102 may include any suitable number of compressors, spools, and turbines, etc.

Referring still to FIG. 2, the prime propulsor is coupled to the turbomachine 102. More particularly, the output shaft 156 (which is coupled to the low pressure shaft 154) is coupled to, and configured to rotate, the prime propulsor of the hybrid electric propulsion system 100, which for the exemplary embodiment depicted is a main rotor assembly 158 (which may be configured in substantially the same manner as the exemplary main rotor assembly 40 of the aircraft 10 of FIG. 1). Notably, the output shaft 156 is mechanically coupled to the main rotor assembly 158 through a gearbox 160. However, in other exemplary embodiments, the output shaft 156 may be coupled to the main rotor assembly 158 in any other suitable manner.

Further, as previously stated, the exemplary hybrid electric propulsion system 100 includes the electric machine 162, which may be configured as an electric motor/generator, and the electric energy storage unit 164. For the embodiment depicted, the electric machine 162 is mechanically coupled to the high pressure shaft 152 of the turbomachine 102. More particularly, for the embodiment depicted, the electric machine 162 is mounted directly to the high pressure shaft 152, such that a rotor of the electric machine 162 is mounted to the high pressure shaft 152. However, in other exemplary embodiments, the electric machine 162 may instead be mechanically coupled to the high pressure shaft 152 in any other suitable manner, such as through a suitable gear train. Accordingly, it will be appreciated that the electric machine 162 may be configured to convert electrical power received to mechanical power for the high pressure shaft 152 (i.e., function as an electric motor), and further may be configured to receive/extract mechanical power from the high pressure shaft 152 and convert such mechanical power to electrical power (i.e., function as an electric generator). Therefore, it will be appreciated that the electric machine 162 may be configured to increase or decrease an effective mechanical power output of the turbomachine 102, and more particularly of the high power turbine 142 of the turbomachine 102 by adding power to, or extracting power from, the high power shaft 152.

Particularly, for the embodiment depicted, the hybrid electric propulsion system 100 is configured to add power to, or extract power from, the turbomachine 102 using the electric machine 162 by way of an electrical connection between the electric machine 162 and the electric energy storage unit 164. The electric energy storage unit 164 may be any component suitable for receiving, storing, and providing electrical power. For example, the electric energy storage unit 164 may be a battery pack, such as a plurality of lithium-ion batteries. In other embodiments, however, any other suitable chemistry of batteries may be utilized. Further, in at least certain exemplary embodiments, the electric energy storage unit 164 may be configured to hold at least about twenty kilowatt-hours of electrical power. For example, in certain exemplary embodiments, the electric energy storage unit 164 may be configured to store at least about thirty kilowatt-hours of electrical power, such as at least about fifty kilowatt-hours of electrical power, such as at least about sixty kilowatt-hours of electrical power, such as up to about five hundred kilowatts hours of electrical power. Moreover, the electric machine 162 may be a relatively powerful electric machine. For example, in certain exemplary embodiments, the electric machine 162 may be configured to generate at least about twenty kilowatts of electrical power. For example, in certain exemplary embodiments, the electric machine 162 may be configured to generate at least about fifty kilowatts of electrical power, such as at least about one hundred kilowatts of electrical power, such as up to about seven hundred and fifty kilowatts of electrical power.

Further, for the embodiment depicted, the controller 166 is operably connected to, e.g., the electric machine 162 and the electric energy storage unit 164 and configured to electrically connect these components and direct electrical power between these components. Accordingly, the controller 166 may be configured to operate the hybrid electric propulsion system 100 between one or more power extraction mode(s) and one or more power addition mode(s). For example, in certain exemplary embodiments, as will be discussed in greater detail below, the controller 166 may be configured to operate the hybrid electric propulsion system in a power extraction mode in response to receiving data indicative of a failure condition of the hybrid electric propulsion system 100. For example, the controller 166 may be configured to operate the hybrid electric propulsion system 100 in a power extraction mode in response to receiving data indicative of a loss of load condition. In such an operating mode, power may be extracted from the turbomachine 102 using the electric machine 162 to slow down one or more rotating components of the turbomachine 102. An exemplary aspect of how such operation may function is described below with reference to the method 200 of FIG. 5. Essentially, however, in response to the failure condition, the hybrid electric propulsion system may operate in the power extraction mode to extract power form the high pressure system, creating a drag on the high pressure system and preventing, or minimizing a chance of the low pressure turbine 144 over-speeding. By preventing, or minimizing, this possibility, the low pressure turbine 144 may not need to be designed to withstand these increased rotational speeds, resulting in a light and more cost effective low pressure turbine 144 (and turbomachine 102).

It should be appreciated however, that although the electric machine 162 is coupled to the high-pressure shaft 152 for the embodiment depicted, in other exemplary embodiments the electric machine 162 may instead be coupled to the low pressure shaft 154 to, e.g., extract power from the low pressure system of the turbomachine 102 and directly reduce a rotational speed of the low pressure system. Additionally, it will be appreciated that, in certain exemplary embodiments, the hybrid electric propulsion system 100 may further include various power electronics components operable with the controller 166 to facilitate the controller 166 directing the electrical power to and/or from electric energy storage unit 164. These various power electronics components may further convert and/or condition electrical power provided between these components as necessary or desired.

Further, referring still to the embodiment of FIG. 2, the hybrid electric propulsion system includes a series of sensors for collecting information indicative of various operating conditions and parameters of the hybrid electric propulsion system. For example, the hybrid electric propulsion system includes a sensor 168 configured to receive data indicative of a rotational speed of the main rotor assembly 158; a sensor 170 configured to receive data indicative of a rotational speed of the output shaft 156; a sensor 172 configured to receive data indicative of a rotational speed of the low pressure shaft 154; a sensor 174 configured to receive data indicative of a rotational speed of the high-pressure shaft 152; and a sensor 176 configured to receive data indicative of one or more of an exhaust gas temperature of the turbomachine 102, a pressure within the combustion section 130 of the turbomachine 102, or other operating condition. It should be appreciated, however, that in other exemplary embodiments, the propulsion system 100 may additionally or alternatively, includes sensors at any other suitable location.

It should also be appreciated that, although a particular aircraft and hybrid electric propulsion system have been illustrated and described, other configurations and/or aircraft may benefit from a hybrid electric propulsion system configured in accordance with one or more the above exemplary embodiments. For example, in other exemplary embodiments, the aircraft may be any other suitable rotary wing aircraft, typically referred to as a helicopter. Additionally, or alternatively, the aircraft may instead be configured as a vertical takeoff and landing aircraft, a fixed wing aircraft commonly referred to as an airplane, etc.

Figure 3:
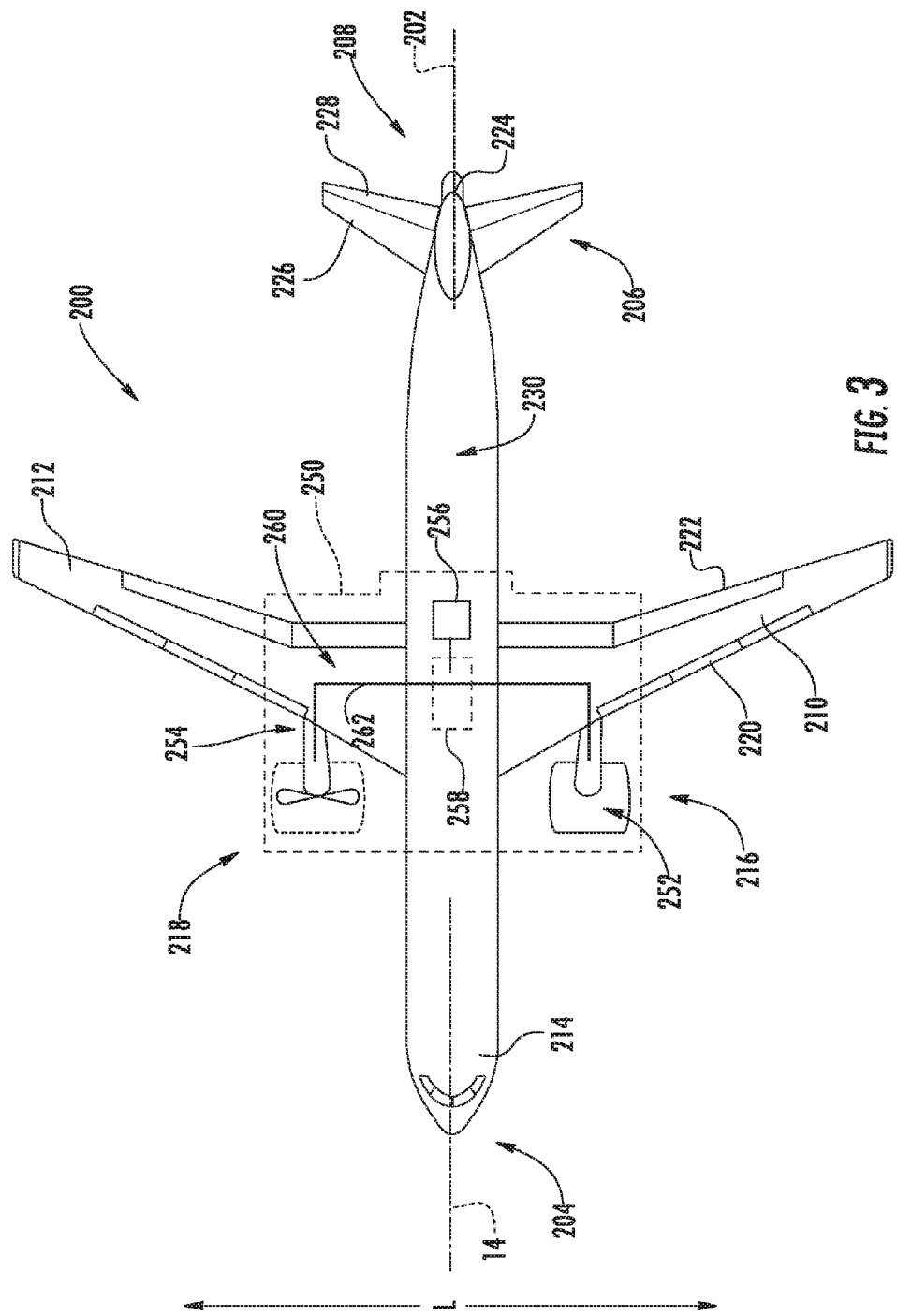
FIG. 3 is top, schematic view of an aircraft in accordance with another exemplary embodiment of the present disclosure.

More specifically, referring now to FIG. 3, a top view of an exemplary aircraft 200 as may incorporate alternative exemplary embodiments of the present disclosure is provided. As shown in FIG. 3, the aircraft 200 defines a longitudinal centerline 202 that extends therethrough, a lateral direction L, a forward end 204, and an aft end 206. Moreover, the aircraft 200 includes a fuselage 214, extending longitudinally from the forward end 204 of the aircraft 200 to the aft end 206 of the aircraft 200, and an empennage 208 at the aft end of the aircraft 200. Additionally, the aircraft 200 includes a wing assembly including a first, port side wing 210 and a second, starboard side wing 212. The first and second wings 210, 212 each extend laterally outward with respect to the longitudinal centerline 202. The first wing 210 and a portion of the fuselage 214 together define a first side 216 of the aircraft 200, and the second wing 212 and another portion of the fuselage 214 together define a second side 218 of the aircraft 200. For the embodiment depicted, the first side 216 of the aircraft 200 is configured as the port side of the aircraft 200, and the second side 218 of the aircraft 200 is configured as the starboard side of the aircraft 200.

Each of the wings 210, 212 for the exemplary embodiment depicted includes one or more leading edge flaps 220 and one or more trailing edge flaps 222. The empennage 208 of the aircraft 200 includes a vertical stabilizer 224 having a rudder flap (not shown) for yaw control, and a pair of horizontal stabilizers 226, each having an elevator flap 228 for pitch control. The vertical and horizontal stabilizers 224, 226 (and respective flaps) allow for the aircraft 10 to translate on or about the longitudinal centerline 202, the lateral direction L, and a vertical direction (not labeled). The fuselage 214 additionally includes an outer surface or skin 230. It should be appreciated however, that in other exemplary embodiments of the present disclosure, the aircraft 200 may additionally or alternatively include any other suitable configuration. For example, in other embodiments, the aircraft 200 may include any other configuration of stabilizer.

The exemplary aircraft 200 of FIG. 3 additionally includes a hybrid-electric propulsion system 250 having a first propulsor assembly 252 and a second propulsor assembly 254. For the embodiment depicted, the first propulsor assembly 252 and second propulsor assembly 254 are each configured in an underwing-mounted configuration. However, as will be discussed below, one or both of the first and second propulsor assemblies 252, 254 may in other exemplary embodiments be mounted at any other suitable location.

Figure 4:
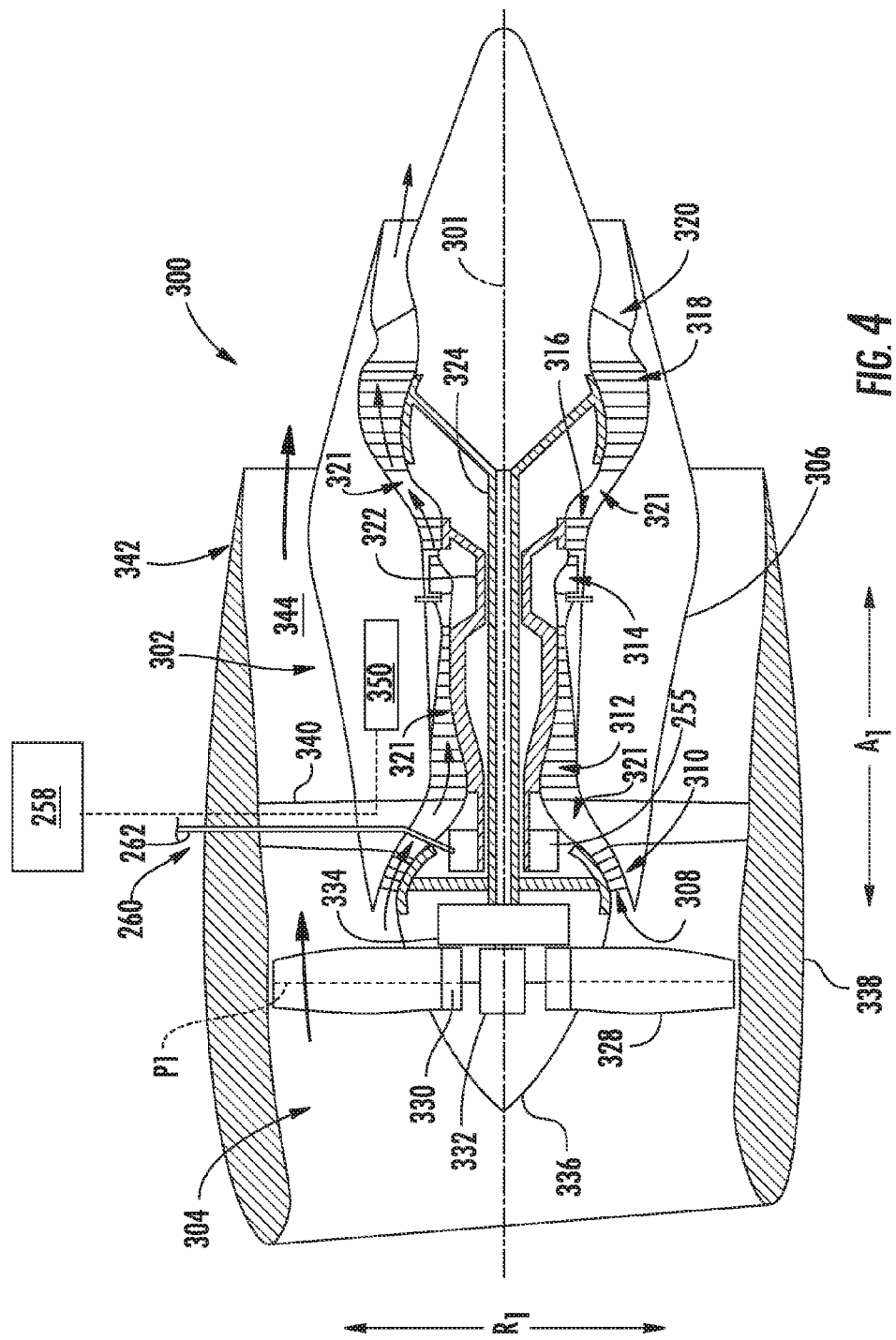
FIG. 4 is a schematic, cross-sectional view of a gas turbine engine as may be incorporated into a hybrid electric propulsion system in accordance with another exemplary embodiment of the present disclosure.

Referring still to FIG. 3, and now also to FIG. 4, providing a schematic, cross-sectional view of the first propulsor assembly 252, the exemplary hybrid-electric propulsion system 250 generally includes the first propulsor assembly 252 having a combustion engine and a prime propulsor (which, for the embodiment of FIG. 4 are configured together as a turbofan engine 300), a first electric machine (which for the embodiment of FIG. 4 is a motor/generator 255) drivingly coupled to the combustion engine, the second propulsor assembly 254 (configured as an electric fan assembly for the embodiment depicted; see FIG. 3), an electric energy storage unit 256, a controller 258, and a power bus 260. Additionally, the first electric machine, the second propulsor assembly 254 (i.e., the fan electric assembly), and the electric energy storage unit 256 are each electrically connectable to one another through one or more electric lines 262 of the power bus 260. For example, the power bus 260 may include various switches or other power electronics movable to selectively electrically connect the various components of the hybrid electric propulsion system 250, and optionally to convert or condition such electrical power transferred therethrough.

As will be described in greater detail below, the controller 258 is generally configured to distribute electrical power between the various components of the hybrid-electric propulsion system 250. For example, the controller 258 may be operable with the power bus 260 (including the one or more switches or other power electronics) to provide electrical power to, or draw electrical power from, the various components to operate the hybrid electric propulsion system 250 in the various operating modes, including, e.g., a power extraction mode and a power addition mode. Such is depicted schematically as the electric lines 262 of the power bus 260 extending through the controller 258. Accordingly, it will be appreciated that the electric machine 255, electric energy storage unit 256, and the second propulsor assembly 254 (i.e., electric fan assembly) are each electrically connectable to one another, and more particularly are selectively in electrical communication with one another through operation of the controller 258.

The controller 258 may be a stand-alone controller, dedicated to the hybrid-electric propulsion system 250, or alternatively, may be incorporated into one or more of a main system controller for the aircraft 200, a separate controller for the exemplary turbofan engine 300 (such as a full authority digital engine control system for the turbofan engine 300, also referred to as a FADEC), etc.

Additionally, the electric energy storage unit 256 may be configured as one or more batteries, such as one or more lithium-ion batteries, or alternatively may be configured as any other suitable electrical energy storage devices. It will be appreciated that for the hybrid-electric propulsion system 250 described herein, the electric energy storage unit 256 is configured to store a relatively large amount of electrical power. For example, in certain exemplary embodiments, the electric energy storage unit may be configured to store at least about twenty kilowatt hours of electrical power, such as at least about fifty kilowatt hours of electrical power, such as at least about seventy-five kilowatts hours of electrical power, and up to about five megawatt hours of electrical power. Additionally, the motor/generator 255 may be a relatively powerful electric machine configured to extract at least about twenty kilowatts of electrical powers during certain operations, such as at least about one hundred kilowatts, such as at least about five hundred kilowatts, such as at least about seven hundred and fifty kilowatts, such as up to about twenty megawatts.

Referring now particularly to FIGS. 3 and 4, the first propulsor assembly 252 includes a combustion engine mounted, or configured to be mounted, to the first wing 210 of the aircraft 200. More specifically, as is depicted, for the embodiment of FIG. 4, the combustion engine is a turbomachine 302, and the first propulsor assembly 252 additionally includes a prime propulsor, or rather a primary fan (referred to simply as "fan 304" with reference to FIG. 4). Accordingly, for the embodiment depicted the turbomachine 302 and the fan 304 are configured together as part of the turbofan engine 300.

As shown in FIG. 4, the turbofan 300 defines an axial direction A1 (extending parallel to a longitudinal centerline 301 provided for reference) and a radial direction R1. Additionally, the exemplary turbomachine 302 depicted generally includes a substantially tubular outer casing 306 that defines an annular inlet 308. The outer casing 306 encases, in serial flow relationship, a compressor section including a booster or low pressure (LP) compressor 310 and a high pressure (HP) compressor 312; a combustion section 314; a turbine section including a first, high pressure (HP) turbine 316 and a second, low pressure (LP) turbine 318; and a jet exhaust nozzle section 320. The compressor section (including compressors 310, 312), combustion section 314, and turbine section (including turbines 316, 318) together define at least in part a core air flowpath 321.

The exemplary turbomachine 302 of the turbofan 300 additionally includes one or more shafts rotatable with at least a portion of the turbine section and, for the embodiment depicted, at least a portion of the compressor section. More particularly, for the embodiment depicted, the turbofan 300 includes a high pressure (HP) shaft or spool 322, which drivingly connects the HP turbine 316 to the HP compressor 312. Additionally, the exemplary turbofan 300 includes a low pressure (LP) shaft or spool 324, which drivingly connects the LP turbine 318 to the LP compressor 310.

Further, the exemplary fan 304 depicted is configured as a variable pitch fan having a plurality of fan blades 328 coupled to a disk 330 in a spaced apart manner. The fan blades 328 extend outwardly from disk 330 generally along the radial direction R1. Each fan blade 328 is rotatable relative to the disk 330 about a respective pitch axis P1 by virtue of the fan blades 328 being operatively coupled to a suitable actuation member 332 configured to collectively vary the pitch of the fan blades 328. The fan 304 is mechanically coupled to the LP shaft 324, such that the fan 304 is mechanically driven by the second, LP turbine 318. More particularly, the fan 304, including the fan blades 328, disk 330, and actuation member 332, is mechanically coupled to the LP shaft 324 through a power gearbox 334, and is rotatable about the longitudinal axis 301 by the LP shaft 324 across the power gear box 334. The power gear box 334 includes a plurality of gears for stepping down the rotational speed of the LP shaft 324 to a more efficient rotational fan speed. Accordingly, the fan 304 is powered by an LP system (including the LP turbine 318) of the turbomachine 302.

Referring still to the exemplary embodiment of FIG. 4, the disk 330 is covered by rotatable front hub 336 aerodynamically contoured to promote an airflow through the plurality of fan blades 328. Additionally, the turbofan 300 includes an annular fan casing or outer nacelle 338 that circumferentially surrounds the fan 304 and/or at least a portion of the turbomachine 302. Accordingly, the exemplary turbofan 300 depicted may be referred to as a "ducted" turbofan engine. Moreover, the nacelle 338 is supported relative to the turbomachine 302 by a plurality of circumferentially-spaced outlet guide vanes 340. A downstream section 342 of the nacelle 338 extends over an outer portion of the turbomachine 302 so as to define a bypass airflow passage 344 therebetween.

Referring still to FIG. 4, the hybrid-electric propulsion system 250 additionally includes an electric machine, which for the embodiment depicted is configured as an electric motor/generator 255. The electric motor/generator 255 is, for the embodiment depicted, positioned within the turbomachine 302 of the turbofan engine 300 and is in mechanical communication with one of the shafts of the turbofan engine 300. More specifically, for the embodiment depicted, the electric motor/generator 255 is positioned inward of the core air flowpath 321 and is driven by the first, HP turbine 316 through the HP shaft 322. The electric motor/generator 255 is configured to convert mechanical power of the HP shaft 322 to electric power during certain operations, and further is configured to convert electrical power to mechanical power in other operations. Accordingly, the electric motor/generator 255 may be powered by the HP system (including the HP turbine 316) of the turbomachine 302 during certain operations and may power the HP system during other operations.

It should be appreciated, however, that in other exemplary embodiments, the electric motor/generator 255 may instead be positioned at any other suitable location within the turbomachine 302 or elsewhere, and may be, e.g., powered in any other suitable manner. For example, the electric motor/generator 255 may be, in other embodiments, mounted coaxially with the HP shaft 322 within the turbine section, or alternatively may be offset from the HP shaft 322 and driven through a suitable gear train. Additionally, or alternatively, in other exemplary embodiments, the electric motor/generator 255 may instead be powered by both the LP system (e.g., the LP shaft 324). Additionally, or alternatively, still, in other embodiments, the electric motor/generator 255 may include a plurality of electric motor/generators, e.g., with one being drivingly connected to the LP system (e.g., the LP shaft 324) and one being drivingly connected to the HP system (e.g., the HP shaft 322).

It should further be appreciated that the exemplary turbofan engine 300 depicted in FIG. 4 may, in other exemplary embodiments, have any other suitable configuration. For example, in other exemplary embodiments, the fan 304 may not be a variable pitch fan, and further, in other exemplary embodiments, the LP shaft 324 may be directly mechanically coupled to the fan 304 (i.e., the turbofan engine 300 may not include the gearbox 334). Further, it should be appreciated that in other exemplary embodiments, the first propulsor assembly 252 may include any other suitable type of engine. For example, in other embodiments, the turbofan engine 300 may instead be configured as a turboprop engine or an unducted turbofan engine.

Referring still to FIGS. 3 and 4, the turbofan engine 300 further includes a controller 350, and although not depicted, one or more sensors. The controller 350 may be a full authority digital engine control system, also referred to as a FADEC. The controller 350 of the turbofan engine 300 may be configured to control operation of, e.g., the actuation member 332, a fuel delivery system to the combustion section 314 (not shown), etc. Additionally, the controller 350 may be operably connected to the one or more sensors to receive data from the sensors and determine various operational parameters of the turbofan engine 300. For example, the controller 350 may determine one or more of an exhaust gas temperature, a rotational speed of the core (i.e., a rotational speed of the HP system), a compressor discharge temperature, etc. Further, referring back also to FIG. 2, the controller 350 of the turbofan engine 300 is operably connected to the controller 258 of the hybrid-electric propulsion system 250. Moreover, as will be appreciated, the controller 258 may further be operably connected to one or more of the first propulsor assembly 252, the electric motor/generator 255, the second propulsor assembly 254, and the energy storage unit 256 through a suitable wired or wireless communication system (depicted in phantom).

Further, as with the embodiments above, the controller 258 is operably connected to, e.g., the electric machine 255 and the electric energy storage unit and configured to electrically connect these components and direct electrical power between these components. Accordingly, the controller 258 may be configured to operate the hybrid electric propulsion system 250 between one or more power extraction mode(s) and one or more power addition mode(s). For example, in certain exemplary embodiments, as will be discussed in greater detail below, the controller 258 may be configured to operate the hybrid electric propulsion system 250 in a power extraction mode in response to receiving data indicative of a failure condition of the hybrid electric propulsion system 250. For example, the controller 258 may be configured to operate the hybrid electric propulsion system 250 in a power extraction mode in response to receiving data indicative of a loss of load condition. In such an operating mode, power may be extracted from the turbomachine 302 using the electric machine 255 to slow down one or more rotating components of the turbomachine 302. An exemplary aspect of how such operation may function is described below with reference to the method 200 of FIG. 5.

Figure 5:
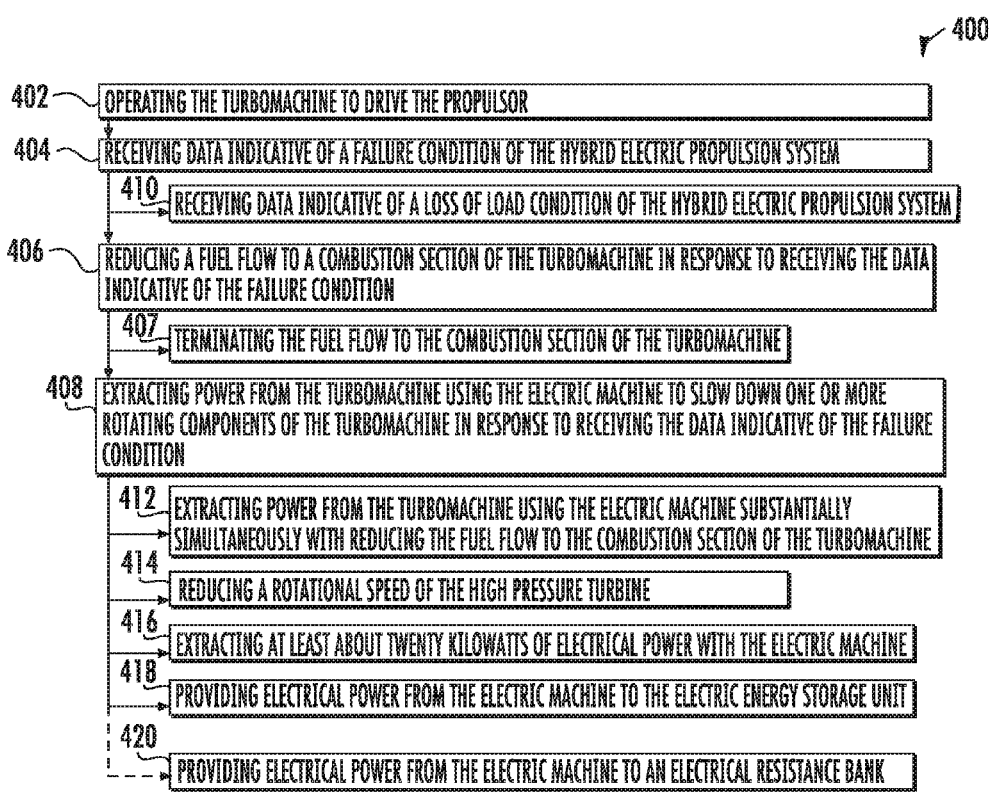
FIG. 5 is a flowchart depicting a method for operating a hybrid electric propulsion system in accordance with an exemplary aspect of the present disclosure.

Referring now to FIG. 5, a flow diagram is provided of a method 400 for operating a hybrid electric propulsion system of an aircraft. The hybrid electric propulsion system may be configured in accordance with one or more the exemplary hybrid electric propulsion systems described above with reference to FIGS. 1 through 4. Accordingly, the hybrid electric propulsion system may generally include a turbomachine, an electric machine coupled to the turbomachine, and a propulsor also coupled to the turbomachine. The propulsor may be, e.g. a fan (see FIG. 4), a main rotor assembly (see FIG. 2), etc.

The method 400 generally includes at (402) operating the turbomachine to drive the propulsor, and at (404) receiving data indicative of a failure condition of the hybrid electric propulsion system. Additionally, the method includes at (406) reducing a fuel flow to a combustion section of the turbomachine in response to receiving the data indicative of the failure condition at (404), and at (408) extracting power from the turbomachine using the electric machine to slow down one or more rotating components of the turbomachine in response to receiving the data indicative of the failure condition at (404). For the aspect depicted, reducing the fuel flow to the combustion section at (406) and extracting power from the turbomachine at (408) are each done in response to receiving the data indicative of the failure condition at (404). Additionally, it will be appreciated that for the exemplary aspect depicted, reducing the fuel flow to the combustion section of the turbomachine at (406) includes at (407) terminating the fuel flow to the combustion section of the turbomachine.

Also for the exemplary aspect depicted in FIG. 5, receiving data indicative of the failure condition of the hybrid electric propulsion system at (404) includes at (410) receiving data indicative of a loss of load condition of the hybrid electric propulsion system. The loss of load condition refers to a condition in which a load on the turbomachine is lost. For example, the loss of load condition may be a shaft failure condition (such as a failure of a fan shaft), a rotor loss condition (e.g., a detachment of a rotor), or a fan loss condition (e.g., a detachment of a fan or other propeller). Additionally, for the exemplary aspect depicted, the turbomachine includes a high pressure turbine and a low pressure turbine, with the electric machine coupled to the high pressure turbine and the propulsor coupled to the low pressure turbine. Accordingly, it will be appreciated that in the event of a loss of load condition of the hybrid electric propulsion system (as is indicated by the data received at (410)), the low pressure turbine may tend to over-speed given the sudden loss of a resistance (i.e., load) on a low pressure system of the turbomachine. For example, when the loss of load condition is a shaft failure or rotor loss, a normal drag on a low pressure shaft connected to the low pressure turbine is eliminated. In such a situation, the energy within a high pressure system of the turbomachine is, in prior configurations, transferred to the low pressure turbine, over-speeding the low pressure turbine. Accordingly, with such an exemplary aspect, the data indicative of the failure condition received at (404) may include data indicative of a rotational speed of the low pressure turbine exceeding an upper rotational speed threshold. However, in other exemplary aspects, the data indicative of the loss of load condition may be a vibration within the engine, a pressure or temperature within one or more of the compressors or turbines, data indicative of an amount of torque on one or more components of the engine (such as data indicative of an amount of torque on a low pressure shaft or an output shaft), etc.

Therefore, it will be appreciated, that for the exemplary aspect depicted, reducing the fuel flow to the combustion section of the turbomachine at (406) and extracting power from the turbomachine using the electric machine to slow down one or more rotating components of the turbomachine at (408) each occurs subsequent to, or simultaneously with, receiving data indicative of the failure condition of the hybrid electric propulsion system at (404). More specifically, for the exemplary aspect depicted, extracting power from the turbomachine using the electric machine at (408) includes at (412) extracting power from the turbomachine using the electric machine substantially simultaneously with reducing the fuel flow to the combustion section of the turbomachine at (408). It will be appreciated that, as used herein, the term "substantially simultaneously" refers to the two events occurring at least in part within a relatively small timeframe. For example, substantially simultaneously may refer to the two events occurring at least in part within a ten second window, such as within an eight second window, such as within a five second window, such as within a two second window.

As stated, in order to prevent, or reduce, a likelihood of the low pressure turbine over-speeding in the event of the failure condition of the hybrid electric propulsion system, the method 400 extracts power from the turbomachine using the electric machine at (408). More specifically, for the exemplary aspect depicted, extracting power from the turbomachine using the electric machine to slow down one or more rotating components of the turbomachine at (408) includes at (414) reducing a rotational speed of the high pressure turbine. For example, the electric machine may be mechanically coupled to the high pressure turbine, e.g., through a high pressure shaft of the turbomachine, and in extracting electrical power using the electric machine from the high pressure turbine, the electric machine may act as a drag on the high pressure turbine to reduce the rotational speed of the high pressure turbine.

As briefly discussed above, the electric machine may be a relatively powerful electric machine. Accordingly, for the exemplary aspect depicted, extracting power from the turbomachine using the electric machine at (408) further includes at (416) extracting at least about twenty kilowatts of electrical power with the electric machine. Moreover, it will be appreciated that for the exemplary aspect depicted, the hybrid electric propulsion system further includes an electric energy storage unit. Accordingly, for the exemplary aspect depicted, extracting power from the turbomachine using the electric machine at (408) further includes at (418) providing electrical power from the electric machine to the electric energy storage unit. The electrical energy storage unit may be configured to store a relatively large amount of electrical power. For example, in certain exemplary aspects, the electric energy storage unit may be configured to store at least about twenty kilowatt-hours of electrical power.

Notably, however, in other exemplary aspects, extracting electrical power from the turbomachine at (408) may additionally, or alternatively, include providing such electrical power to any other suitable location. For example, as is depicted in phantom, in certain exemplary aspects of the method 400 depicted in FIG. 5, extracting electrical power from the turbomachine at (408) may additionally or alternatively include at (420) providing electrical power from the electric machine to an electrical resistance bank (which may be a plurality of electrical resistors located, e.g., within a fuselage of an aircraft incorporating the hybrid electric propulsion system, each resistor configured to receive an electric charge and dissipate the electrical power as heat). However, in still other exemplary aspects, extracting electrical power from the turbomachine at (408) may include providing electrical power to one or more electrical sinks of the aircraft, or to any other suitable location. Additionally, although for the exemplary aspect of FIG. 5 the electric machine is discussed as being coupled to the high pressure system of the turbomachine, in other exemplary aspects, the electric machine may additionally, or alternatively, be coupled to the low pressure system of the turbomachine, such that extracting power from the turbomachine at (408) additionally, or alternatively, includes extracting power from the low pressure system to reduce an acceleration of the low pressure system following a failure event of the hybrid-electric propulsion system.

Operating the hybrid electric propulsion system in accordance with one or more of the exemplary aspects of FIG. 5 may reduce a likelihood of a low pressure system over-speeding in the event of a failure condition of the hybrid electric propulsion system, such as in the event of a loss of load condition of the hybrid electric propulsion system. By reducing the likelihood of the low pressure system over-speeding, the low pressure system may be designed in a lighter (e.g., smaller) and more efficient manner.

Figure 6:
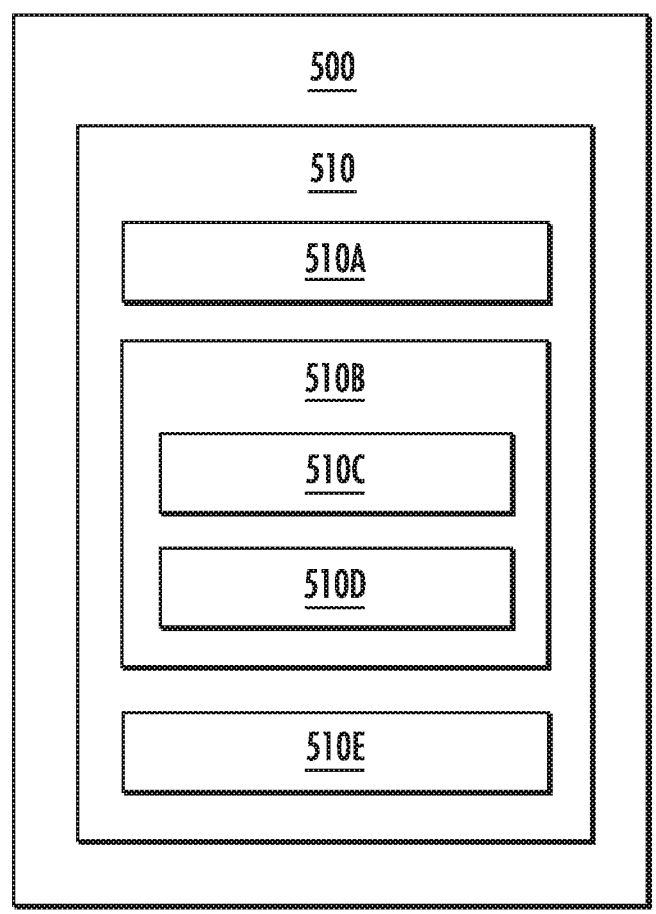
FIG. 6 is a computing system according to example aspects of the present disclosure.

Referring now to FIG. 6, an example computing system 500 according to example embodiments of the present disclosure is depicted. The computing system 500 can be used, for example, as a controller in a hybrid electric propulsion system (e.g., as one or more of controller 166 or controller 258). The computing system 500 can include one or more computing device(s) 510. The computing device(s) 510 can include one or more processor(s) 510A and one or more memory device(s) 510B. The one or more processor(s) 510A can include any suitable processing device, such as a microprocessor, microcontroller, integrated circuit, logic device, and/or other suitable processing device. The one or more memory device(s) 510B can include one or more computer-readable media, including, but not limited to, non-transitory computer-readable media, RAM, ROM, hard drives, flash drives, and/or other memory devices.

The one or more memory device(s) 510B can store information accessible by the one or more processor(s) 510A, including computer-readable instructions 510C that can be executed by the one or more processor(s) 510A. The instructions 510C can be any set of instructions that when executed by the one or more processor(s) 510A, cause the one or more processor(s) 510A to perform operations. In some embodiments, the instructions 510C can be executed by the one or more processor(s) 510A to cause the one or more processor(s) 510A to perform operations, such as any of the operations and functions for which the computing system 500 and/or the computing device(s) 510 are configured, the operations for operating a hybrid electric propulsion system of an aircraft (e.g., method 400), as described herein, and/or any other operations or functions of the one or more computing device(s) 510.

Accordingly, in one or more exemplary embodiments, the exemplary method 200 may be a computer-implemented method. The instructions 510C can be software written in any suitable programming language or can be implemented in hardware. Additionally, and/or alternatively, the instructions 510C can be executed in logically and/or virtually separate threads on processor(s) 510A. The memory device(s) 510B can further store data 510D that can be accessed by the processor(s) 510A. For example, the data 510D can include data indicative of power flows, data indicative of power demands of various loads in a hybrid electric propulsion system, data indicative of operating parameters of a hybrid electric propulsion system, including, power output demands, rotational speeds of the turbomachines, power levels of electric energy storage units, etc.

The computing device(s) 510 can also include a network interface 510E used to communicate, for example, with the other components of system 500 (e.g., via a network). The network interface 510E can include any suitable components for interfacing with one or more network(s), including for example, transmitters, receivers, ports, controllers, antennas, and/or other suitable components. One or more external display devices (not depicted) can be configured to receive one or more commands from the computing device(s) 510.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for operating a hybrid electric propulsion system of an aircraft, the hybrid electric propulsion system comprising a turbomachine, an electric machine coupled to the turbomachine, and a propulsor coupled to the turbomachine, the method comprising:
    operating the turbomachine to drive the propulsor;
    receiving data indicative of a failure condition of the hybrid electric propulsion system;
    reducing a fuel flow to a combustion section of the turbomachine in response to receiving the data indicative of the failure condition; and
    extracting power from the turbomachine using the electric machine to slow down one or more rotating components of the turbomachine in response to receiving the data indicative of the failure condition.

2. The method of claim 1, wherein extracting power from the turbomachine using the electric machine comprises extracting power from the turbomachine using the electric machine substantially simultaneously with reducing the fuel flow to the combustion section of the turbomachine.

3. The method of claim 1, wherein the turbomachine comprises a high pressure turbine and a low pressure turbine, wherein the electric machine is coupled to the high pressure turbine and wherein the propulsor is coupled to the low pressure turbine.

4. The method of claim 3, wherein the data indicative of the failure condition is data indicative of a rotational speed of the low pressure turbine exceeding an upper rotational speed threshold.

5. The method of claim 3, wherein extracting power from the turbomachine using the electric machine to slow down one or more rotating components of the turbomachine comprises reducing a rotational speed of the high pressure turbine.

6. The method of claim 1, wherein the failure condition is a loss of load condition.

7. The method of claim 1, wherein the turbomachine is a turboshaft engine including a low pressure turbine and an output shaft coupled to the low pressure turbine.

8. The method of claim 7, wherein the aircraft is a helicopter, wherein the propulsor is a rotor assembly, and wherein the output shaft drives the rotor assembly.

9. The method of claim 1, wherein extracting power from the turbomachine using the electric machine comprises extracting at least about twenty kilowatts of electrical power with the electric machine.

10. The method of claim 1, wherein the hybrid electric propulsion system further comprises an electric energy storage unit, and wherein extracting power from the turbomachine using the electric machine comprises providing electrical power from the electric machine to the electric energy storage unit.

11. The method of claim 10, wherein the electric energy storage unit is configured to store at least about twenty kilowatt-hours of electrical power.

12. The method of claim 1, wherein extracting power from the turbomachine using the electric machine comprises providing electrical power from the electric machine to an electrical resistance bank.

13. The method of claim 1, wherein reducing the fuel flow to the combustion section of the turbomachine comprises terminating the fuel flow to the combustion section of the turbomachine.

14. A hybrid electric propulsion system for an aircraft comprising:
    a turbomachine comprising a combustion section;
    a propulsor coupled to the turbomachine;
    an electric machine coupled to the turbomachine; and
    a controller configured to receive data indicative of a failure condition of the hybrid electric propulsion system during operation of the turbomachine and, in response, reduce a fuel flow to the combustion section of the turbomachine and extract power from the turbomachine using the electric machine to slow down one or more rotating components of the turbomachine.

15. The hybrid electric propulsion system of claim 14, wherein the controller is configured to extract power from the turbomachine using the electric machine substantially simultaneously with reducing the fuel flow to the combustion section of the turbomachine.

16. The hybrid electric propulsion system of claim 14, wherein the turbomachine comprises a high pressure turbine and a low pressure turbine, wherein the electric machine is coupled to the high pressure turbine and wherein the propulsor is coupled to the low pressure turbine.

17. The hybrid electric propulsion system of claim 16, wherein in extracting power from the turbomachine using the electric machine to slow down one or more rotating components of the turbomachine, the controller is configured to reduce a rotational speed of the high pressure turbine.

18. The hybrid electric propulsion system of claim 14, wherein the turbomachine is a turboshaft engine including a low pressure turbine and an output shaft coupled to the low pressure turbine.

19. The hybrid electric propulsion system of claim 14, wherein in extracting power from the turbomachine using the electric machine, the controller is configured to extract at least about twenty kilowatts of electrical power with the electric machine.

20. The hybrid electric propulsion system of claim 14, wherein the hybrid electric propulsion system further comprises an electric energy storage unit, and wherein in extracting power from the turbomachine using the electric machine, the controller is configured to provide electrical power from the electric machine to the electric energy storage unit.

\* \* \* \* \*